March 18, 1969  D. E. H. BOUZEREAU  3,432,989
MACHINE FOR STOPPERING BOTTLES
Filed Jan. 23, 1967  Sheet 1 of 2
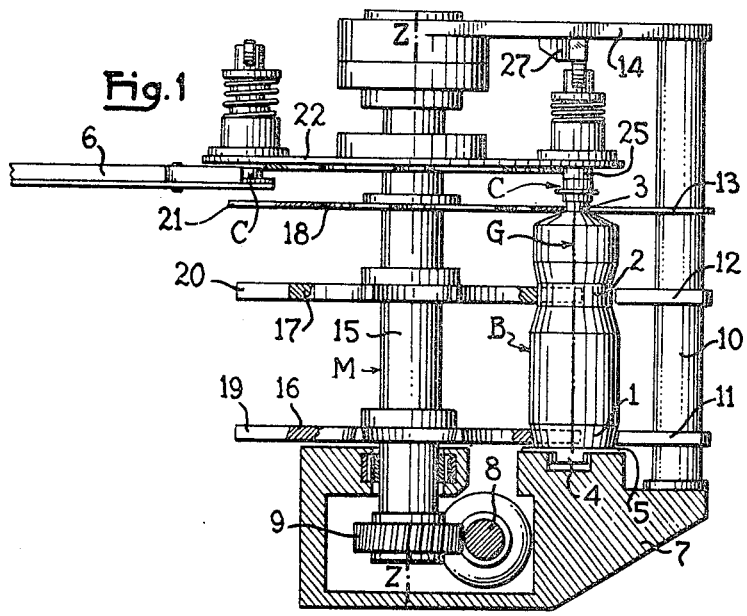
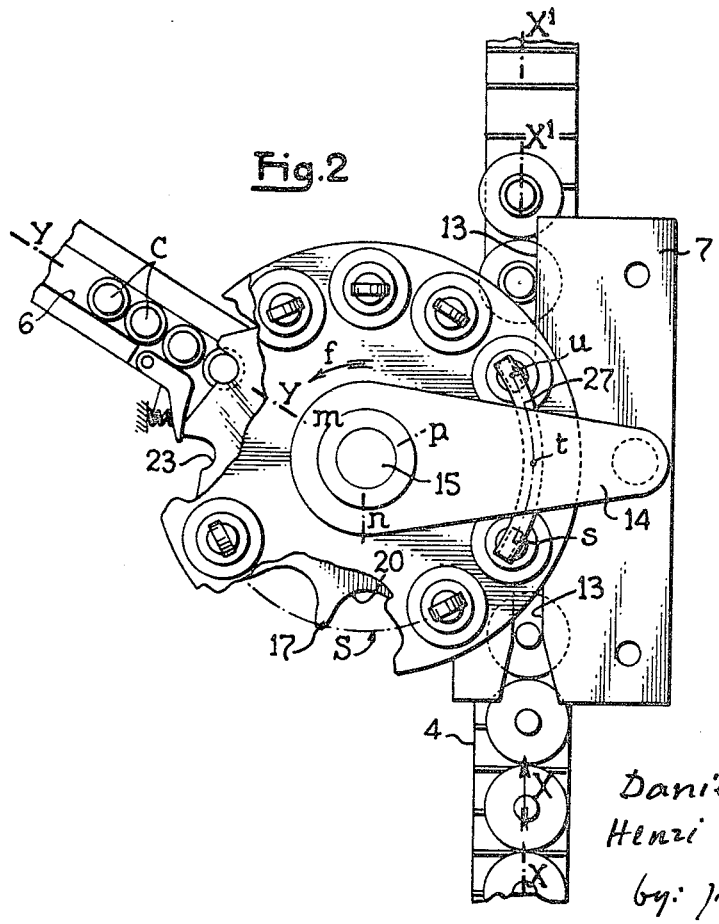
INVENTOR:
Daniel Emile
Henri BOUZEREAU
by: J. Dellatre Seguy
Attorney

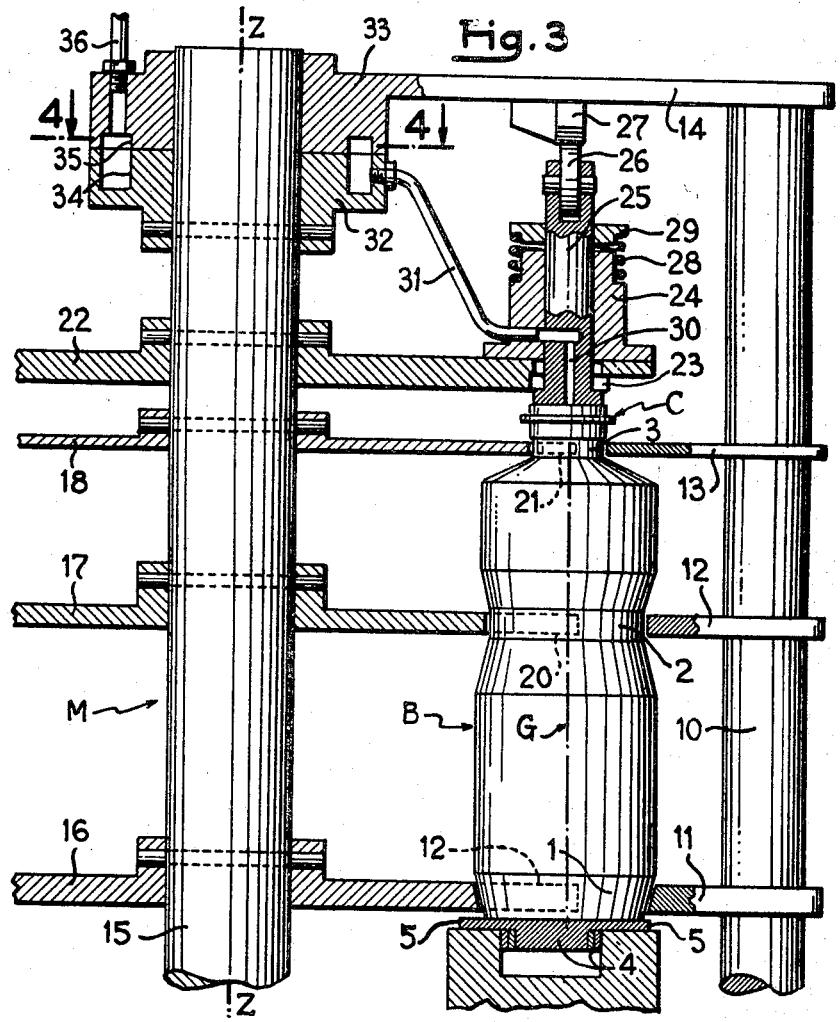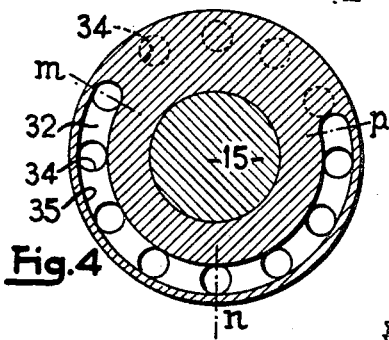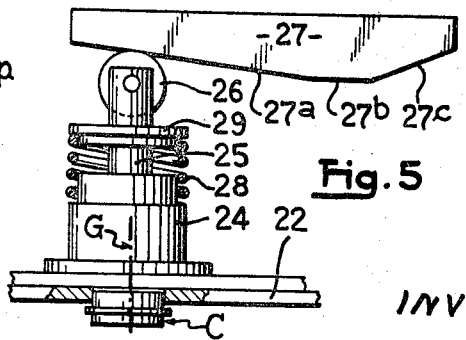

United States Patent Office 3,432,989
Patented Mar. 18, 1969

3,432,989
MACHINE FOR STOPPERING BOTTLES
Daniel Emile Henri Bouzereau, Taverny, France, assignor to Centre de Recherches de Pont-a-Mousson, a French body corporate
Filed Jan. 23, 1967, Ser. No. 610,834
Claims priority, application France, Mar. 28, 1966, 55,179
U.S. Cl. 53—264            9 Claims
Int. Cl. B65b 7/28; B67b 7/28

ABSTRACT OF THE DISCLOSURE

Bottle stoppering machines of known type comprise pered in a practically rectilinear path by conveying them in a rectilinear path to a rotating turntable having notches for engaging the bottles, the conveying path of the bottles being substantially tangent to the pitch circle of the notches, the turntable carrying means for holding stoppers vertically above the bottles and thrust elements for thrusting the stoppers downwardly into engagement with the bottles, the thrust elements being urged downwardly by a fixed cam located above the turntable in the region where the conveying path is tangent to the pitch circles of the notches.

---

The present invention relates to machines for stoppering bottles and more particularly to those for inserting in the neck of the bottles stoppers or capsules which require only small engaging forces, cork stoppers and ring-type stoppers being consequently excluded.

Bottle stoppering machines of known type comprise a conveyor supplying bottles at a high rate and a conveyor supplying stoppers or capsules. These machines were initially designed for glass bottles which do not have absolutely identical dimensions and are also employed for the new plastics bottles having much more precise dimensions. They comprise a bottle handling chain or conveyor having a straight path interrupted by a path in the form of a loop which is almost closed in which the stoppering operation is carried out. This loopshaped path results in a considerable detour of the bottles after which the stoppered bottles return to the straight path. This loop-shaped detour constitutes a kind of roundabout which was heretofore considered essential owing to the great amount of time necessary for the stoppering operation which involved use of a neck-centering cone in the face of a high bottle feed rate.

The object of the invention is to provide a new machine which is particularly adapted to bottles and flasks of glass or of plastics or other material which are now manufactured with precise dimensions. This new machine permits the stoppering to be effected in a practically rectilinear path, in particular owing to the elimination of the bottle neck-centering cone, so that the detour effected by the bottles in a circular path similar to a roundabout is eliminated.

The machine according to the invention comprises in combination a support, a rectilinear bottle conveying means; a stopper feed passageway; a circular turntable for seizing and bringing the stoppers above the necks of the bottles and for shifting and guiding the bottles relative to the stoppers, said turntable being continuously rotated and disposed tangentially of the bottle conveying means, said turntable comprising circular coaxial plates arranged in tiers, said plates having on their periphery notches identical pitch circles and are coaxial from one tier to another but which have different dimensions in the various tiers corresponding to the section of the stoppers and the sections of the bottles; means on the upper plate for maintaining the stoppers above the notches and for thrusting the stoppers into the bottles; a fixed cam located above the turntable in the region in which the turntable is tangent to the rectilinear bottle conveying means, said cam being fixed to said support and having for function to force the stoppers into the neck of the bottles and cooperating with said thrusting means mounted on the upper plate of the turntable.

Owing to this combination, the machine effects a rectilinear bottle stoppering operation which ensures a much higher bottle stoppering rate than was possible with known machines.

Further features and advantages of the invention will be apparent from the ensuing description with reference to the accompanying drawings.

In the drawings:

FIG. 1 is a diagrammatic elevational view, partially in section, of a machine according to the invention;

FIG. 2 is a corresponding plan view of the machine with parts cut away;

FIG. 3 is a partial elevational view, with parts in section, of the machine on an enlarged scale;

FIG. 4 is a sectional view taken along line 4—4 of FIG. 3; and

FIG. 5 is a detail view of the bottle stoppering mechanism.

(I) Description

The illustrated embodiment of the invention concerns a machine for stoppering bottles B (FIGS. 1 and 3). The latter can be for example, but not exclusively, of plastic material and have a circular section which for example varies from the neck down, namely a lower section 1 which is slightly smaller than the mean section of the bottle or container, a middle section 2 constituting a narrowed portion which facilitates taking hold of the bottle, and an upper section 3 corresponding to the neck. The dimensions of these bottles are precise. These bottles must be stoppered for example by means of stoppers C of plastics material.

The machine according to the invention comprises:
A bottle supply or feed means;
A stopper feed means.
And on the bottle stoppering machine proper:
A support and a drive mechanism for the machine;
A turntable for shifting the bottles and the stoppers;
A bottle stoppering device.

Bottle feed

The bottle feed device comprises a rectilinear endless chain conveyor 4 which is shown in plan in FIG. 2 and has an axis X—X. The links of this rectilinear chain carry support plates 5 (FIGS. 1 and 3) supporting the bottles B. The chain 4 is driven in synchronism with the stopper feed turntable under the control of an electric device (not shown) which is responsive to the stoppering of the bottles on the chain 4.

Stopper feed

The stoppers are fed in an uninterrupted line to a feed passageway or channel 6, having an axis Y—Y (FIG. 2), for example by means of a thrust piston (not shown). The channel 6 feeding the stoppers 6 has a horizontal plane. The position of the axis Y—Y of the channel relative to the machine will be defined hereinafter.

Stoppering machine (1) *Support and mechanism.*—Its support comprises a base 7 in which the drive mechanism is disposed. The drive mechanism comprises a motor (not shown), a worm 8 (FIG. 1) and a corresponding wormwheel 9 which has a vertical axis Z—Z and drives the centre shaft 15 of the machine. The base 7 supports a vertical upright 10 carrying three guide ramps arranged in tiers 11, 12 and 13 respectively at the levels of the sections 1, 2 and 3 of the bottles B to which they correspond. These ramps comprise a straight guide portion parallel to the axis X—X along which the bottles are fed, an arcuate portion coaxial with the turntable and restricted to the zone of passage of the chain 4 under the turntable, and another straight portion offset from the first-mentioned portion but parallel to the latter so as to cause the bottles to issue from the turntable along an axis $X^1$—$X^1$ (FIG. 2). The ramps 11, 12 and 13 are at distances from the axis X—X and $X^1$—$X^1$ which correspond to the radii of the sections 1, 2 and 3 and are in fact slightly greater than these radii so as to provide clearance facilitating the guiding without jamming.

The vertical upright 10 carries in its upper part a bolster 14 which supports, in the upper part of the axis Z—Z, a fluid distributor for the stoppering device and, above the axis X—X along which the bottles travel, a cam for the stoppering device.

(2) *The turntable M.*—It comprises a center shaft 15 having an axis Z—Z which is driven, as mentioned hereinbefore, by the wormwheel 9 in the direction of arrow $f$ (FIG. 2). The axis Y—Y along which the stoppers C are fed is disposed radially of the turntable since the axis Y—Y intersects the axis Z—Z.

The shaft 15 is journalled at its lower end in the base 7 and at its upper end in the bolster 14. It carries three circular plates or stars 16, 17, 18 (FIGS. 1 and 3) which are arranged in tiers respectively at the levels of the guide ramps 11, 12 and 13 to which they correspond. These horizontal plates are provided with notches 19, 20 and 21 which correspond to the sections 1, 2 and 3 of the bottles and are therefore somewhat in the form of toothed wheels. Located above the upper plate 18 is a fourth horizontal plate 22 located above the upper part of the neck of the bottles. This stopper seizing plate 22 carries as many stopper holding devices as there are notches. The notches 19, 20 and 21 are arranged on circles which are coaxial with the circles on which are arranged notches 23 (FIG. 2) in which the stoppers C are engaged and stopper holding devices. The common axes of the notches 19, 20, 21, 23 of the stopper holding devices constitute generatrices G (FIGS. 1 and 3) of a cylindrical geometric surface S which has an axis Z—Z and is tangent to the axis X—X along which the bottles are fed. The common axes of the notches are spaced apart at a pitch equal to the distances between the axes of the bottles which are in adjoining relation on the chain 4.

*Stoppering device.*—Each stopper holding device for holding stoppers in the apertures 23 (FIGS. 3, 4 and 5) essentially comprises: a tubular body 24 which is secured to top of the plate 22 and has its axis coinciding with a generatrix G of the aforementioned cylindrical surface, and a thrust element 25 slidable in the body 24 for the purpose of exerting pressure on a stopper C. This thrust element carries in its upper part a roller 26 which rolls along a curved cam 27 for controlling the insertion of the stoppers; the development of this cam is shown in FIG. 5. The thrust element 25 is biased upwardly by a spring 28 which applies the roller 26 against the cam 27 when the thrust element passes under the latter and which maintains the thrust element in an upper position raising the stoppers above the neck of the bottles when the thrust element is clear of the cam. The spring 28 bears against a shoulder on the tubular body 24 and on a ring 29 rigid with the thrust element. At its lower end, the thrust element comprises a suction nozzle 30 which performs the function of a sucker for maintaining a stopper C in a notch 23 above the neck of the bottles.

The nozzle 30 is connected by a conduit 31 to a suction distributor consisting of two superimposed rings, namely a movable lower ring 32, connected to rotate with the shaft 15, and an upper fixed ring 33 carried by the bolster 14. The lower ring 32 comprises as many apertures 34 arranged on a circumference and connected to the conduit 31 as there are notches in the various aforementioned plates. The fixed ring 33 has an arcuate suction inlet port 35 whose mean radius equals that of the circle on which the apertures 34 are arranged and whose width is equal to the diameter of said apertures. The arcuate port 35 is limited to an arc $m$–$n$–$p$ (FIGURES 2 and 4) which subtends an angle of 240° at the centre. This arc is located between a radius in the vertical plane of the axis Y—Y of the stopper feed channel 6 and a radius intersecting the region in which the chain 4 conveying the bottles passes under the turntable M. Communicating with the arcuate port 35 is a conduit 36 which is connected to a source of vacuum or a vacuum pump (not shown). Thus, the thrust elements 25 constitute suckers only when their suction pipe 31 is connected to the conduit 36, that is to say, when the aperture 34 corresponding to the thrust element is moved in front of the port 35 within the arc $m$–$n$–$p$. When the aperture 34 of the thrust element 25 faces the solid part of the ring 33 corresponding to the small 120° arc $p$–$m$, the thrust element 25 no longer acts as a sucker and releases the stopper.

The end $p$ of the port 35 is located in that zone of the cam 27 for inserting the stoppers so that the thrust elements 25 can move away from the inserted stoppers in the course of the rotation of the turntable.

The cam 27 (FIGS. 1, 2, 3 and 5) is curved so as to comprise an arcuate portion which subtends a small angle at the centre corresponding to the axis Z—Z of the turntable M and is restricted to the zone of passage of the chain 4 under the turntable. Its lower edge constitutes an active surface which comprises a ramp $27^a$ which is slightly downwardly inclined for the progressive insertion of the stoppers in each bottle, a horizontal flat portion $27^b$ for maintaining the stoppers inserted and a steeply upwardly inclined short ramp $27^c$ for rapidly releasing the stopper inserting pressure.

(II) OPERATION

Let it be assumed that the plates 5 of the endless chain 4 are supplied with bottles B which are arranged one against the other and that the channel 6 is filled with stoppers C with the machine inoperative.

Upon starting up the machine, the shaft 15 starts to rotate in the direction of arrow $f$ (FIG. 2) and drives the turntable M, namely the plates 16, 17, 18, 22 and the suction distributor ring 32. The chain 4 is driven in synchronism with the turntable M.

The notches 19, 20 and 21 of the plates 16, 17, 18 feed the bottom B by engaging the sections 1, 2 and 3 of these bottles which act in the manner of links of a chain since the generatrices G of the mean cylindrical surface S of the turntable pass in turn through the axis X—X along which the bottles are fed. As the bottles approach the bottle stoppering region, the stoppers C, which are fed one by one along the channel 6, engage the successive notches 23 of the plate 22 and the latter simultaneously drives the stoppers towards the bottle stoppering region. When the stopper engages a notch 23 at the outlet end of the feed channel 6 and at the input of the turntable M, it is placed under a thrust element 25 of a stopper holding device which is at this moment in its upper position with the spring 28 extended. Further, the thrust element 25 is connected to the source of vacuum by way of the conduit 31, and aperture 34, the port 35 and the conduit 36. The thrust element 25 thus forms a sucker and exerts a suction on the stopper 6 and holds it in the notch 23 in the course of the rotation of the plates. The same is true of all the stoppers when they enter the turntable.

When a bottle and a stopper arrive in the stoppering region, they are necessarily in vertical alignment with each other since the notches 23 in which the stoppers are located are exactly in vertical alignment with the notches 19, 20 and 21 containing the bottles, since all the notches have a common axis G. In the bottle stoppering region *stu*

(FIG. 2) the roller 26 of a thrust element 25 holding a stopper C engages the ramp 27a of the bottle stoppering cam 27. As the rotation of the turntable proceeds, the roller 26 causes the thrust element 25 to descend and moves the stopper C towards the neck of the bottle. Upon arriving at the tangent point $t$ between the surface S and the axis X—X, the roller 26 continues to roll along the ramp 27a and causes the stopper C to engage the neck of the bottle. Thenceforth, the bottles B, which are guided by the ramps 11, 12 and 13, are slightly deviated from the axis X—X and follow a path corresponding to a portion $tu$ of an arc of the turntable during the stopper inserting stage. When the roller 26 reaches the end of the ramp 27a the stopper has been completely inserted. In reaching the flat portion 27b, the roller 26 maintains the stopper inserted and in engaging the ramp 27c the roller 26 is biased by the spring 28 and causes the thrust element 25 to rise away from the stopper, this element ceasing to act as a sucker. Indeed, the ring 32 has reached the end of the arcuate port 35. The aperture 34 corresponding to the thrust element in question is therefore closed off by the solid part of the fixed ring 33 and the suction ceases.

The stoppered bottle B continues to move on the chain 4 and issues at $u$ of the turntable M on the axis $X^1$—$X^1$, which is slightly offset from the axis X—X while the thrust element 25 which has just been moved away from a stopper C finishes its rotation of the turntable and returns to the stopper feed channel 6. Thus, the bottles B are stoppered one after the other and step by step.

Owing to the tangential feeding of the bottles relative to the turntable M and owing to the combined arrangement of the chain conveyor 4, the guide ramps 11, 12 and 13 of the bottles and the corresponding plates 16, 17 and 18 constitute a veritable chain and sprocket mechanism, the links of the chain being formed by the bottles and the sprockets by the plates. Owing to the precise vertical alignment of the notches of the plates on common axes constituting the generatrices G of a cylindrical surface S and owing to the spacing of the notches which is equal to the centre distances between successive bottles, there is a perfect synchronism between the feeding of the bottles and the feeding of the stoppers.

In the bottle stoppering region, at the point of tangency of the bottle feed conveyor 4 and the turntable M, a stopper C is located exactly above the neck of a bottle B. This ensures not only operational reliability but also a maximum output of stoppered bottles.

Further, for a given output of stoppered bottles, the rate of travel of the bottles is reduced to a minimum since, for each fraction of a rotation corresponding to a space between two consecutive bottles, there corresponds a minimum forward travel of the bottle which is equal to the pitch, namely the centre distance between two consecutive adjoining bottles.

The machine has a minimum overall height since the base of the stopper can be placed close to the top of the neck owing to the absence of the conventional centering cone. The elimination of the latter is possible since the centering of the bottle neck with respect to the stopper is achieved automatically owing to the axial alignment of the notches 23 of the plate 22 with the notches 19, 20 and 21 of the plates 16, 17, 18 engaging the bottles.

Owing to the slight deviation in the path of movement of the bottles along an arcuate sector $tu$ subtending a small angle at the centre necessary for the insertion of the stopper—the bottle travels without a sudden change in direction and consequently without creating a disturbance in the liquid it contains. This avoids splashing and loss of liquid.

It should be observed that it is due to the elimination of the centering cone and to the aforementioned combination of the superposed notched plates of the turntable and the conveyor chain, that it is possible to stopper the bottles on a substantially straight line (axis X—X, followed by the deviation arc $tu$ and then the axis $X^1$—$X^1$) without shifting the bottles away from the chain 4 and without causing them to effect a complete rotation on the turntable as in known machines. This arrangement therefore results in a machine which has a high bottle stoppering rate and an output of stoppered bottles which is much greater than that of the known machines in which the bottles must pass through a much longer handling circuit. The positioning of the stopper C is controlled to the maximum extent owing to the combination of the feed channel 6 and the notches 23, the stoppers sliding along this channel on the axis Y—Y which is oriented to intersect the axis Z—Z of the turntable and consequently the axis of a notch 23.

The machine therefore ensures operational synchronism and regularity in a simple manner. It is very strong and very rapid in operation.

Although a specific embodiment of the invention has been described, many modifications and changes may be made therein without departing from the scope of the invention as defined in the appended claims.

Thus the machine is of utility in the stoppering of glass bottles which can have any shape but precise dimensions. It is consequently of utility for bottles which have or do not have a narrowed middle portion such as the portion 2. It is sufficient to provide notches of suitable dimensions on the plates 16, 17 and 18.

The machine is also of utility in the engagement of metal capsules for example of aluminum which require only small engaging forces.

The port 35 instead of subtending an arc of 240° at the centre could be limited to any appropriate angle at the centre which creates the suction on the axis Y—Y along which the stoppers are fed and stops the suction at the earliest when the roller 26 is at the end of the ramp 27a and at the latest when the roller 26 starts to roll along the ramp 27c.

Having now described my invention what I claim as new and desire to secure by Letters Patent is:

1. A bottle stoppering machine comprising in combination: a support, a rectilinear bottle conveying means; a stopper feed passageway; a circular turntable for seizing and bringing the stoppers above the necks of the bottles and for shifting and guiding the bottles relative to the stoppers, said turntable being continuously rotated and disposed tangentially of the bottle conveying means, said turntable comprising circular coaxial plates arranged in tiers, said plates having on their periphery notches which have identical pitch circles and are coaxial from one tier to another but which have different dimensions in the various tiers corresponding to the section of the stoppers and the sections of the bottles; means on the upper plate for maintaining the stoppers above the notches and for thrusting the stoppers into the bottles; and a fixed cam located above the turntable in the region in which the turntable is tangent to the rectilinear bottle conveying means, said cam being fixed to said support and having for function to force the stoppers into the neck of the bottles and co-operating with said thrusting means mounted on the upper plate of the turntable.

2. A machine as claimed in claim 1, wherein bottle guide ramps arranged in tiers and cooperating with the turntable are located in the zone in which the rectilinear bottle conveying means is tangent to the turntable at the same levels as said plates of the turntable.

3. A machine as claimed in claim 2, wherein said ramps comprise two straight guide portions which are parallel to the direction of movement of the bottle conveying means and offset from each other, and an arcuate intermediate portion subtending a small angle at the centre located on the axis of rotation of the turntable so as to cause the bottles to shift from an input axis of travel to an output axis of travel which is offset from the input axis while maintaining the bottles on said conveying means.

4. A machine as claimed in claim 3, wherein the stopper inserting cam is fixed to the upper part of the support of the machine and has an arcuate portion which subtends a small angle at the centre located on the axis of rotation of the turntable and is limited to the zone of passage of the conveying means under the turntable, the arcuate portion having a lower active surface for inserting the stoppers into the bottles and having first a portion which is downwardly inclined in the direction of movement of the turntable and then a horizontal flat portion and thereafter a steeper upwardly inclined portion.

5. A machine as claimed in claim 1, wherein the notches of the plates are spaced equal distances apart from each other so that the plates constitute toothed wheel structures which engage with the bottles on an arc subtending a small angle at the centre located on the axis of rotation of the turntable, said notches of the various plates having common vertical axes corresponding to generatrices of a cylindrical geometric surface tangent to the input axis along which the bottles are fed on the rectilinear conveying means.

6. A machine as claimed in claim 1, wherein the upper plate has on its lower face stopper receiving notches and on its upper face as many stopper maintaining and thrusting means as there are notches in the upper plate.

7. A bottle stoppering machine as claimed in claim 6, wherein the stopper maintaining and thrusting means comprise cylindrical bodies carried by the upper plate, thrust elements vertically slidable in said bodies in coaxial relation to the corresponding notches, a source of vacuum, apertures in the thrust elements in communication with the source of vacuum whereby the thrust elements constitute suckers for maintaining the stoppers, and means for elastically biasing the thrust elements upwardly against the cam in the zone of passage of the conveying means under the turntable.

8. A machine as claimed in claim 7, wherein the thrust elements are connected to the source of vacuum through a distributor which is coaxial with the turntable and comprises an arcuate suction inlet port which is also coaxial with the turntable and subtends an angle at the centre on the axis of the turntable defined by a radius intersecting the stopper feed passageway and a radius intersecting the zone of passage of the conveying means under the turntable.

9. A machine as claimed in claim 7, wherein each thrust element carries at its upper part a roller for rolling against the cam and is biased upwardly by a spring which applies it elastically against the cam in the course of the passage of the thrust element under the cam.

References Cited

UNITED STATES PATENTS

| | | | |
|---|---|---|---|
| 2,810,249 | 10/1957 | Wysocki | 53—319 X |
| 2,840,970 | 7/1958 | Brown | 53—328 X |

TRAVIS S. McGEHEE, *Primary Examiner.*

U.S. Cl. X.R.

53—300, 304, 328